United States Patent Office 3,133,693
Patented May 19, 1964

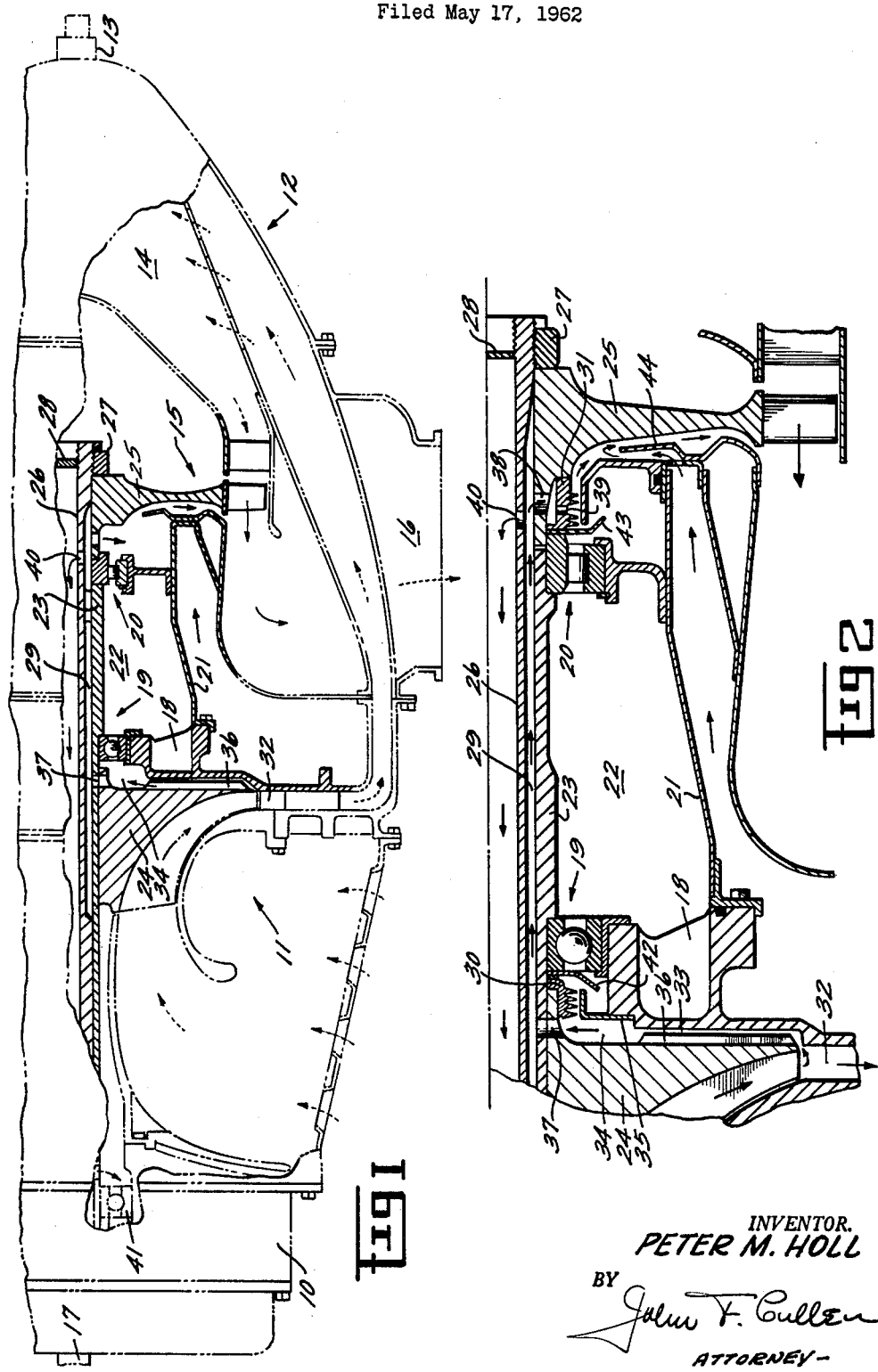

3,133,693
SUMP SEAL SYSTEM
Peter Matthew Holl, Walnut Creek, Calif., assignor to General Electric Company, a corporation of New York
Filed May 17, 1962, Ser. No. 195,525
7 Claims. (Cl. 230—116)

The present invention relates to a sump sealing system and, more particularly, to such a system that is particularly adaptable to a gas turbine engine.

Small gas turbine power plants that are compact and that must be made lightweight and cheap encounter problems in lubrication of the engine. Such engines are generally of the high speed and reasonably high temperature type and, because of their compactness, require specialized lubrication and cooling arrangements in order to fit the particular configuration. In such engines, it is conventional to employ an oil sump which collects for scavenging the lubricating oil fed to the various bearings of the engine. Naturally, it is desirable to prevent leakage from the sump into the gas stream or elsewhere resulting in high oil consumption as well as a reduction in efficiency. Leakage into the gas stream can result in carbonizing on other parts of the engine, especially on any regeneration equipment that may be used since exhaust gases are passed over this equipment to heat the incoming air. Obviously, carbonization results in lower heat exchange and lowered efficiency.

A conventional seal that is commonly used is a carbon rubbing seal. However, in high speed machinery in the environment herein contemplated, carbon seals have disadvantages. Such seals are quite expensive and delicate to handle to avoid damage to the smooth surfaces. Additionally, a speed limitation is involved in the use of carbon seals in order for them to operate satisfactorily. The system disclosed herein contemplates speeds above the limiting speeds of carbon seals, or at least in the area where carbon seals reach the limit of their usefulness. In such applications, it is desirable to provide a sealing structure that is inherently lightweight, rugged, and inexpensive as well as being able to perform its function satisfactorily.

The main object of the present invention is to provide an oil sump sealing system for a gas turbine engine which encompasses part of the engine structure and which employs air to maintain the oil in the oil sump.

A further object is to provide such a system wherein the sealing structure is rugged and lightweight and does not require a high precision finish or close tolerances.

Another object is to provide such a system wherein air is used to maintain the oil in the sump and the same air is additionally used for cooling purposes in the inherently hot parts of the engine.

Briefly stated, the invention discloses an oil sump sealing system for a gas turbine engine which has an engine frame that carries one of the bearings, a second bearing that is spaced from the first bearing and is carried by a cantilevered support member that is attached to the frame. These members constitute the principal static parts of the system and also form the oil sump. A hollow shaft is mounted for rotation in the bearings and carries an impeller on one end and a turbine on the other. A hollow bolt is passed through the shaft to bolt the impeller and turbine together in compression on the hollow shaft and labyrinth seal members are disposed between the bearings and the impeller and turbine. Air is provided by the impeller to the seal members to leak in a metered amount into the sump to maintain the sump pressurized and keep the oil therein. The air is passed through the shaft between the bolt and the shaft for cooling purposes and is metered in two directions at the turbine seal to pressurize the sump and cool the turbine wheel.

While the specification concludes with claims particularly pointing out and distinctly claiming the subject matter which I regard as my invention, it is believed the invention will be better understood from the following description taken in connection with the accompanying drawing in which:

FIGURE 1 is an overall power plant with the structure comprising the instant invention shown in solid lines and the rest in phantom.

FIGURE 2 is an enlarged version in section of the structure of the invention.

Referring to the drawing, a general engine arrangement is shown which is typical of a small turboshaft engine that is operable in the horizontal or vertical direction and includes a gear box 10, compressor section 11 with an outlet to reverse flow combustor 12 having a fuel injector 13 and an igniter (not shown). Combustion gas in combustion area 14 passes forwardly through turbine 15 and out a suitable exhaust outlet 16 whence it is disposed overboard or used elsewhere. A suitable power take-off 17 may be provided in any suitable location or locations on gear box 10.

The sealing system of the instant invention, as shown in the solid lines of FIGURE 1 and in detail in FIGURE 2, comprises an engine frame 18 which, for the engine shown, may be termed the compressor frame since it is the main frame of the engine. For support of the rotating parts of the engine, frame 18 carries a first bearing generally indicated at 19 which may take both thrust and radial loads. Spaced support is provided by a second bearing generally indicated at 20 that is carried by a support member 21 that is cantilevered in any suitable manner, such as that shown, at one end on the main part of the frame and extends downstream. It will be noted that these members provide a volume 22 which forms the oil sump of the system.

In order to carry the rotating parts of the engine a hollow shaft 23 is rotatably supported in bearings 19 and 20 and carries a compressor or impeller 24 at one end on the outside of the frame and a turbine 25 at the opposite end or the upstream and downstream ends, respectively. These members are held on the shaft by a hollow through bolt 26 having a nut 27 at the turbine end and any suitable fastening means, not shown, at the other end. The bolt may be closed by a suitable plug 28 as shown at the turbine end. It can be seen that an annulus 29 is thus formed between the shaft and bolt for a purpose to be described.

In order to seal the sump against oil leakage a first seal member, such as a labyrinth seal 30 is provided between bearing 19 and impeller 24 and rotates with shaft 23. A second seal member 31 is provided between bearing 20 and turbine 25. It will be appreciated that both of these seal members also form part of the boundary wall of the sump 22.

In order to prevent loss of oil from the sump 22 it is desired to meter or leak a small amount of pressurized air into the sump area. Oil is supplied to the bearings by tubes and jets (not shown). It will be appreciated that the sump has a scavenge and vent line (not shown) in order to avoid an excessive build up of pressure therein and to return oil to the supply tank for recirculation as is customary. The air supply for pressurization is obtained from impeller 24 which is carried in a closely spaced nesting relation with frame 18. Since high pressure air is exiting from the impeller at 32 to be used elsewhere for combustion, the normal running clearances will allow leakage behind the impeller to pressurize space 33. To supply the required pressurized air for sealing the sump, frame 18 and impeller 24 are spaced to provide an air chamber 34 therebetween. A ring member 35 is mounted on the frame to form the stationary part of seal 30 and one wall or boundary of the air chamber, the impeller forming the opposite boundary. High pressure air will naturally flow into air chamber 34. To maintain the chamber at a desired lower pressurization for proper pressure differential across the seals, the impeller is provided with pumping vanes 36 in the space between the impeller and frame, and these vanes are so designed to pump chamber 34 down to the desired pressure.

It can be seen that the higher pressure air in chamber 34 will leak past the teeth of labyrinth seal 30 into the sump 22 and thereby prevent oil flow past the seal teeth and out of the sump. The proper design of labyrinth seal tooth configuration and the clearance between the rotating seal member 30 and stationary member 35 of the seal 30 as well as the pressure level of the air in chamber 34 enables any desired metered air leakage into sump 22.

It is further desired to direct the pressurized air from chamber 34 to the second seal member 31. To this end, a bleed hole or opening 37 is provided in the impeller and shaft to connect chamber 34 with annulus 29. Passage of the air forward through annulus 29 cools the shaft 23 and bolt 26. A similar opening 38 is provided at the opposite end of the shaft, or in the hub of turbine 25, to bleed air through a similar opening 39 in seal member 31. Opening 39 is disposed in the center of the seal member so that air is bled into the sump in a metered quantity as well as in the opposite direction against the face of turbine 25. An additional opening 40 may be provided in hollow bolt 26 to connect with annulus 29 and allow the passage of air for use elsewhere such as forward to bearing 41 (FIGURE 1). Plug 28 insures that the air within the hollow bolt flows in the desired direction.

Inasmuch as the air supply is compressor air it may be warmer than the temperature at which the bearings normally operate. Thus, it may be desirable to protect the bearings against the impingement of the warm air. This is accomplished by the provision of slingers in the form of rings 42 and 43 which are disposed on the shaft between each seal and its associated bearing. Slingers 42 and 43 are extended radially, as shown, beyond the bearing to shield the bearing from the direct air impingement from the seal. Additionally, the slingers perform the usual function of centrifuging the oil back into the sump. The cooling of the face of turbine wheel 25 may be obtained primarily from the leakage of the seal 31, where the air flow divides, or such cooling may be supplementary and the main cooling obtained by other structure generally indicated at 44 as shown by the arrows indicating air flow from another source. In either case, whether supplementary or main cooling is obtained, the leakage of air past seal 31 is used to cool the turbine as well as pressurize the sump seal.

It can be seen that a constant and desired air pressure from chamber 34 is thus used to pressurize the sump from both sides as well as cooling the shaft and through bolt and the turbine wheel. This is done with the use of labyrinth seals that are inexpensive and lightweight and are usable in very high speed application. Further, none of the parts require extremely close tolerances and the seals lend themselves to adequate control in the amount of air supplied for cooling or sealing.

While I have hereinbefore described a preferred form of my invention, obviously many modifications and variations of the present invention are possible in the light of the above teachings. It is therefore to be understood that within the scope of the appended claims, the invention may be practiced otherwise than as specifically described.

I claim:

1. An oil sump sealing system for a gas turbine engine comprising,
   an engine frame,
   a bearing in said frame,
   a support member cantilevered at one end on said frame and extending downstream thereof,
   a second bearing carried on the support at the other end,
   a hollow shaft supported in said bearings for rotation,
   an impeller on said shaft upstream of and spaced adjacent said frame,
   a turbine on said shaft downstream of said second bearing,
   a bolt extending through said shaft and spaced therefrom to form an annulus, said bolt connecting said impeller and turbine in compression against said bearings whereby an oil sump is formed by said frame, support member and bearings,
   a labyrinth seal member between each of said impeller and bearing and between said second bearing and turbine,
   said labyrinth seal between said turbine and second bearing having an opening therein to direct air between the teeth thereof,
   said shaft having an opening connecting said annulus and said labyrinth opening, and
   means directing air past said seals into said sump to prevent oil leakage therefrom,
   whereby air is supplied and metered to said sump and to said turbine past the seal teeth.

2. Apparatus as described in claim 1 wherein said impeller is disposed in a nesting relation with said frame to form an air chamber between said impeller and seal,
   said frame and shaft having openings connecting said air chamber and annulus to supply air to the annulus and thence to said labyrinth seal between said turbine and second bearing.

3. An oil sump sealing system for a gas turbine engine comprising,
   an engine frame,
   a first bearing in said frame,
   a support member cantilevered at one end on said frame and extending downstream thereof,
   a second bearing carried on the support at the other end,
   a hollow shaft supported in said bearings for rotation,
   an impeller on said shaft upstream of and spaced in a nesting relation with said frame,
   a turbine on said shaft downstream of said second bearing,
   a bolt extending through said shaft and spaced therefrom to form an annulus,
   said bolt connecting said impeller and turbine in compression against said bearings whereby an oil sump is formed by said frame, support member and bearings;
   a first labyrinth seal member between said impeller and said first bearing,
   a ring on said frame forming the stationary part of said first seal and one boundary of an air chamber in the space between said impeller and frame,
   bleed means connecting said annulus and air chamber,
   a second labyrinth seal between said second bearing and turbine and connected to said annulus, and means including said annulus directing air past said seals into said sump to prevent oil leakage therefrom.

4. Apparatus as described in claim 3 wherein said impeller has pumping vanes thereon in the space between it and said frame to remove air from the air chamber and reduce pressure therein.

5. Apparatus as described in claim 3 wherein said second seal has an opening therein to direct air between the teeth thereof,
   said shaft having an opening connecting said annulus and said seal opening whereby air is supplied and metered to said sump and to said turbine past the seal teeth.

6. Apparatus as described in claim 5 wherein said impeller and shaft have openings therein connecting said air chamber to bleed air therefrom to said annulus, through said shaft, and thence to said second seal to meter air to and pressurize said sump from both seals.

7. Apparatus as described in claim 6 wherein slinger rings are disposed on said shaft between each seal and bearing and extend radially beyond said bearing to shield said bearing from direct air impingement from said seals.

References Cited in the file of this patent

UNITED STATES PATENTS

| | | |
|---|---|---|
| 1,779,076 | Ray | Oct. 21, 1930 |
| 2,163,464 | Llewellyn | June 20, 1939 |
| 2,492,672 | Wood | Dec. 27, 1949 |
| 2,541,850 | Wade | Feb. 13, 1951 |
| 2,620,123 | Parducci | Dec. 2, 1952 |
| 2,646,210 | Kohlmann et al. | July 21, 1953 |
| 2,823,008 | Grey | Feb. 11, 1958 |
| 2,823,052 | Collman | Feb. 11, 1958 |
| 2,916,332 | Pavlecka | Dec. 8, 1959 |
| 2,925,215 | Weatherbee | Feb. 16, 1960 |
| 2,963,268 | Smile et al. | Dec. 6, 1960 |
| 2,963,307 | Bobo | Dec. 6, 1960 |
| 2,973,136 | Greenwald | Feb. 28, 1961 |

FOREIGN PATENTS

| | | |
|---|---|---|
| 179,929 | Austria | Oct. 25, 1954 |